UNITED STATES PATENT OFFICE.

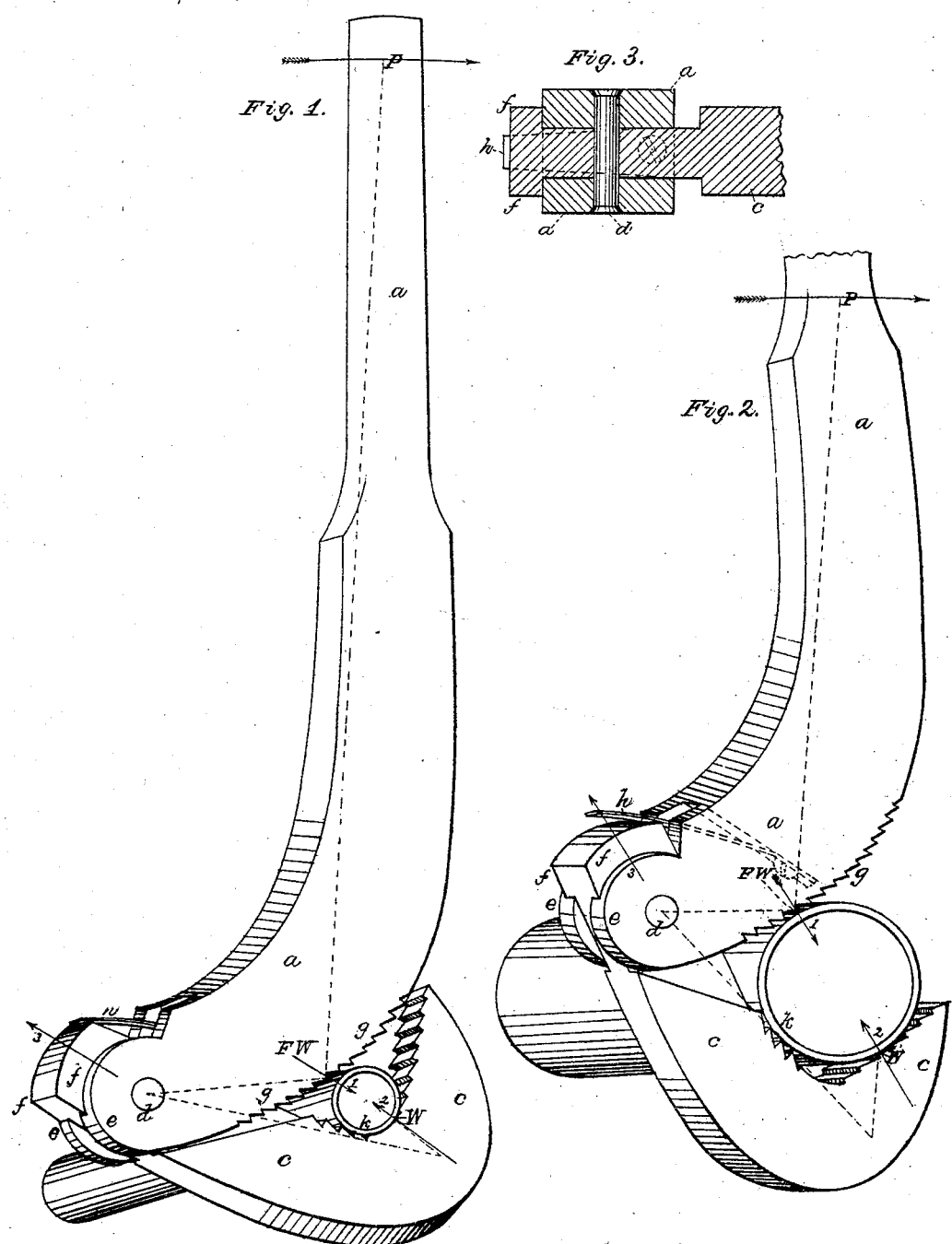

HENRY B. WHEATCROFT, OF NEW YORK, N. Y., ASSIGNOR TO J. AUSTIN & CO., OF SAME PLACE.

IMPROVEMENT IN PIPE-WRENCHES.

Specification forming part of Letters Patent No. 145,263, dated December 2, 1873; application filed September 25, 1873.

*To all whom it may concern:*

Be it known that I, HENRY B. WHEATCROFT, of New York city, N. Y., have invented an Improved Pipe-Wrench, of which the following is a specification:

This invention consists of a lever-bar curved at one end, and serrated on its convex side at a distance from the end, with a hook-shaped dog having re-enforcing clips pivoted to the extreme end thereof and pressed by a spring in a backward direction against the convex serrated face on the side of the lever, the form and relative arrangements of parts being such that simplicity of construction is effected and a tighter grip brought to bear upon the article seized by the wrench.

Figure 1 is a perspective view, representing my improved pipe-wrench applied to a pipe of the smallest diameter which it is adapted to grasp; and Fig. 2 is a like view, showing a pipe of the largest diameter which a wrench of this size is capable of grasping. Fig. 3 is a fragmentary section through the connecting-joint of the lever-bar and dog on the plane of the center of the pin $d$, showing the arrangement of the re-enforcing clips.

As shown in the drawings, $a$ is the lever-bar, which is curved at the fulcrum end to form a convex working face, $g$, on the side of the bar, at a distance from the end of the same, and which is hardened and serrated. The dog or hook $c$ is secured in the jaws $e\ e$, formed at the extreme end of the bar, by the pin $d$, on which it turns freely, and is so held by the pressure-spring $h$ that its point closes upon the convex face of the bar when at rest. The face of the dog is concave, or of such a shape that when closed upon the face $g$ an approximately-triangular opening will be formed by the working-faces of the bar and dog. The working-face of the dog is also hardened and serrated, as is that of the bar; but the serrations or teeth of the same point in the opposite direction to those on the bar, as is usual in these implements, as shown in Figs. 1 and 2. The spring $h$ is secured to the lever-bar in the throat of the jaws $e\ e$, and presses forward against the short arm of the dog in such a way that its resistance keeps the dog $c$ closed upon the working-face $g$, or upon the article which it grasps, the spring yielding to gentle pressure to open the faces when applied, and it renders the wrench self-adjustable to pipes or bolts of varying sizes without requiring manipulation of screws or keys, as in the common wrench. This spring, being secured between the jaws $e\ e$ of the lever-bar, as shown in Figs. 1 and 2, is removed from exposure to blows or injuries which might render it inoperative, and which it would be more liable to receive were it otherwise situated. The short arm of the dog $c$ is extended laterally over the jaws $e\ e$ of the lever-bar, so as to form re-enforcing clips $f\ f$, which embrace the rounded jaws, being concentric with the same and with the pin $d$, as shown in Figs. 1 and 2, and in section in Fig. 3.

When the wrench is applied to a pipe or bolt, $k\ k$, the point of contact of the lever-bar with the same forms a fulcrum, as shown at F W, Figs. 1 and 2, from which the strain applied to the end of the lever at $p$ is distributed, first, in a direction inward against the pipe at the point of contact F W, as shown by arrow 1; and, second, upward upon the dog, in the direction of arrow 3, drawing the same inward upon the pipe at the opposite side, as shown by arrow 2 at the point W, so that the two serrated surfaces embrace the pipe with great force and in proportion to the strain upon the lever. This upward strain upon the dog is very great, and is chiefly resisted by the clips $f\ f$, whose function is then brought into action, and re-enforce the resistance offered by the axial pin $d$, the two effectually resisting any strain to which the wrench may be subjected. When the wrench is turned to the right, in the direction of arrow P, with the parts in the position just described, the pipe, being tightly grasped thereby, rotates with it; but when turned in the opposite direction the gripe of the dog is released, and the wrench slips around the tube freely; and when turned again to the right the gripe is again resumed, and is increased as the strain upon the lever is increased. Thus, by alternate partial revolutions, the pipe or bolt is screwed up the required distance.

The simple construction of my wrench, and the form and arrangement of the parts, are such that it can be manufactured at a low price, the convex serrated face of the bar being formed by simply bending the end into a curve, and filing teeth transversely on the same; and the jaws for the dog being arranged at the extreme end, they are more readily formed than they could be were they otherwise situated.

I claim as my invention—

In combination with the curved lever-bar $a$, serrated on its convex side at a distance from the end, the dog $c$, having the re-enforcing clips $f f$, and pivoted to the extreme end of the bar, and pressed backward by the spring $h$ against the serrated surface $g$ on the side of the bar, the whole arranged and operating substantially as shown and described.

In witness whereof I have hereunto signed my name in the presence of two subscribing witnesses.

HENRY B. WHEATCROFT.

Witnesses:
CHARLES M. HIGGINS,
JONA. AUSTIN.